United States Patent [19]
Yamada

[11] Patent Number: 5,349,404
[45] Date of Patent: Sep. 20, 1994

[54] FINDER INDICATION OPTICAL SYSTEM IN A SINGLE-LENS REFLEX CAMERA

[75] Inventor: Kenji Yamada, Yachiyo, Japan

[73] Assignee: Nikon Corporation, Tokyo, Japan

[21] Appl. No.: 161,488

[22] Filed: Dec. 6, 1993

[30] Foreign Application Priority Data

Dec. 15, 1992 [JP] Japan .................. 4-353775

[51] Int. Cl.$^5$ .............................. G03B 19/12
[52] U.S. Cl. .................. 354/152; 354/219; 354/289.1
[58] Field of Search ............... 354/471–475, 354/152, 219–225, 289.1–289.12

[56] References Cited

U.S. PATENT DOCUMENTS

| | | | |
|---|---|---|---|
| 4,833,494 | 5/1989 | Ohsawa | 354/152 |
| 5,245,375 | 9/1993 | Ohshita | 354/219 |

*Primary Examiner*—David M. Gray
*Attorney, Agent, or Firm*—Shapiro and Shapiro

[57] ABSTRACT

A finder indication optical system in a single lens reflex camera comprising an eyepiece, an indicator for indicating photographing information, a pentagonal prism having a third reflecting surface for reflecting light from an object, a light transmitting portion provided adjacent to the third reflecting surface for receiving a light beam from the indicator and transmitting the light beam therethrough, and a pentagonal prism exit surface from which emerge the light beam from the indicator transmitted through the light transmitting portion and the light from the object reflected by the third reflecting surface, and a deflection prism disposed between the eyepiece and the pentagonal prism and having an entrance surface opposed to the pentagonal prism exit surface and substantially parallel to the pentagonal prism exit surface and a deflection prism exit surface opposed to the eyepiece and substantially parallel to the surface of the light transmitting surface, the deflection prism being for receiving the light beam from the indicator emerging from the pentagonal prism exit surface by the entrance surface thereof and causing the light beam to emerge from the deflection prism exit surface to the eyepiece.

5 Claims, 2 Drawing Sheets

FINDER INDICATION OPTICAL SYSTEM IN A SINGLE-LENS REFLEX CAMERA

BACKGROUND OF THE INVENTION

1. Field of the Invention

This invention relates to a finder indication optical system in a single-lens reflex camera.

2. Related Background Art

A prior-art finder optical system in a single lens reflex camera is shown in FIG. 1 of the accompanying drawings. As shown in FIG. 1, in the prior-art finder optical system, an object image on a focusing screen 1 is observed through a pentagonal prism 2 and an eyepiece 3, and information such as aperture value and shutter speed is observed through the eyepiece 3 by light emerging from an indicator 4 being reflected by reflecting mirrors 5 and 6 and being passed through a light transmitting portion 2b provided on the upper portion of a third reflecting surface 2a of the pentagonal prism 2.

Photometry for obtaining proper exposure is accomplished by light emerging substantially from the center of the focusing screen 1 and light reflected by the roof surface 2c and third surface 2a of the pentagonal prism 2 being condensed by a condensing lens 7 and being received by a light receiving element 8.

In recent years, however, with the advance of the photometering method, not only the central portion but also the marginal portion of the image field has come to be photometered precisely and therefore, the expanse of a light beam necessary for photometry has become large and the reflection area of said third reflecting surface 2a has come to be enlarged in the vertical direction.

Therefore, the light transmitting portion 2b located on the upper portion of the third reflecting surface 2a is forced up (12b) as shown in FIG. 2 of the accompanying drawings, and as a result, as shown in FIG. 3 of the accompanying drawings, the indication 20 of photographing information rises too much upwardly in the field of view and the distance thereof from the object image 21 becomes long, and this has led to a problem that it becomes difficult to observe the object image 21 and the indication 20 of the photographing information at a time.

In order to solve this problem, it would occur to mind to place a deflection prism in the optical path of the indication optical system, but if a deflection prism is provided in the optical path of the indication optical system, astigmatism will be created in an indicating light beam, and this gives rise to a problem that the indication is not seen clearly.

SUMMARY OF THE INVENTION

The present invention solves such problems peculiar to the prior-art finder indication optical system in the single-lens reflex camera, and has as its object the provision of a finder indication optical system in a single-lens reflex camera which readily enables an object and photographing information to be observed at a time and moreover can clearly indicate the photographing information.

To achieve the above object, a finder indication optical system in a single-lens reflex camera according to the present invention is provided with an indicating portion for indicating photographing information, and a light transmitting portion provided adjacent to a third reflecting surface of a pentagonal prism for transmitting therethrough a light beam from said indicating portion and directing it to an eyepiece, and a deflection prism having an entrance surface substantially parallel to the exit surface of said pentagonal prism and an exit surface substantially parallel to said light transmitting portion is provided between said pentagonal prism and said eyepiece.

Preferably, said deflection prism may be made of plastic.

In the finder indication optical system contructed as described above, photographing information such as aperture value and shutter speed is indicated in said indicating portion. The light beam of the photographing information emerging from said indicating portion enters the pentagonal prism from said light transmitting portion provided adjacent to the third reflecting surface of said pentagonal prism contained in the finder, and passes through the pentagonal prism and thereafter is directed to said deflection prism.

The light beam is then deflected by the deflection prism so that the angle formed by it with respect to the optical axis of the eyepiece may become small, and is directed to said eyepiece.

Since said deflection prism is disposed so that its entrance surface may be substantially parallel to the exit surface of said pentagonal prism and its exit surface may be substantially parallel to said light transmitting portion which is the entrance surface for the indicating light beam to said pentagonal prism, astigmatism is corrected.

That, ignoring the difference in refractive index between said pentagonal prism and said deflection prism, and the slight spacing therebetween, said light transmitting portion to said deflection prism can be regarded as a sheet of plane parallel glass and therefore, even if the deflection prism is provided in the optical path of the indication optical system, the creation of astigmatism can be minimized.

DESCRIPTION OF THE PREFERRED EMBODIMENTS

Figure 1:
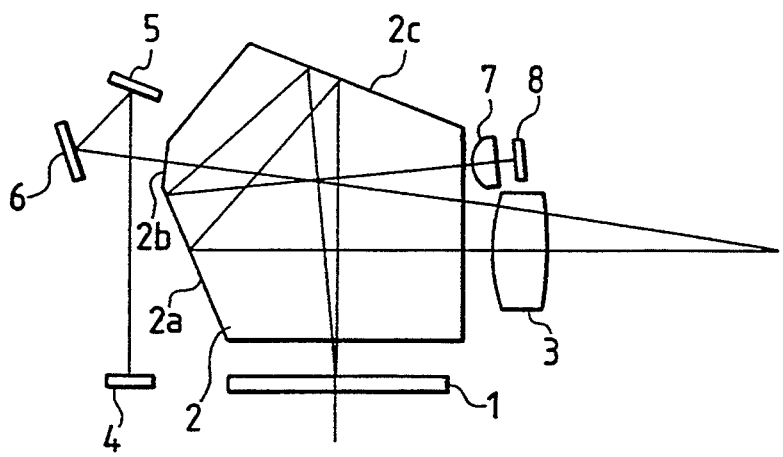
FIG. 1 is an illustration showing the construction of a finder optical system according to the prior art.
Figure 2:
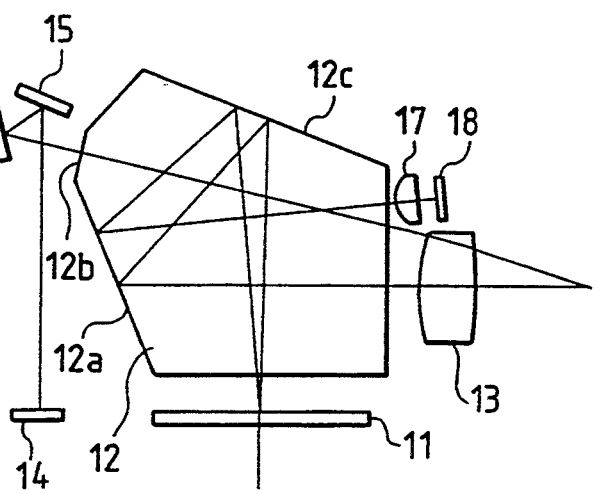
FIG. 2 is an illustration showing the construction of a finder optical system according to the prior art having an enlarged third reflecting surface.
Figure 3:
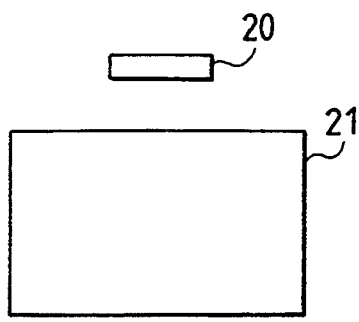
FIG. 3 shows the finder field of view of the finder optical system shown in FIG. 2.
Figure 4:
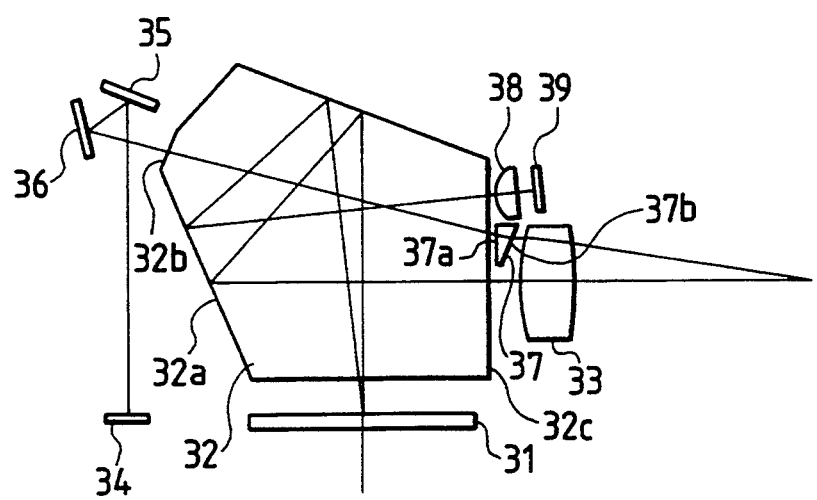
FIG. 4 is an illustration showing the construction of an embodiment of the present invention.

An embodiment of the present invention will hereinafter be described with reference to the drawings. Referring to FIG. 4 which is an illustration showing the construction of an embodiment of the present invention, the reference numeral 31 designates a focusing screen, the reference numeral 32 denotes a pentagonal prism, the reference numeral 33 designates an eyepiece, the reference numeral 34 denotes an indicator for indicating photographing information such as aperture value and shutter speed, the reference numerals 35 and 36 designate reflecting mirrors, and the reference numeral 37 denotes a deflection prism. The reference numerals 38 and 39 designate a condensing lens and a light receiving element, respectively, for effecting photometry to obtain proper exposure.

A light transmitting portion 32b for transmitting therethrough indicating light from the indicator 34 and directing it to the eyepiece 33 is provided on the pentagonal prism 32 above and adjacent to a third reflecting surface 32a. The deflection prism 37 provided between the exit surface 32c of the pentagonal prism 32 and the eyepiece 33 is disposed so that its entrance surface 37a may be substantially parallel to the exit surface 32c of the pentagonal prism and its exit surface 37b may be parallel to the light transmitting portion 32b of the pentagonal prism.

The light beam emerging from the indicator 34 is reflected by the reflecting mirrors 35 and 36, is directed into the pentagonal prism 32 through the light transmitting portion 32b, and is transmitted through the pentagonal prism 32. The light beam emerging from the pentagonal prism 32 is deflected by the deflection lens 37 so that the angle formed by it with respect to the optical axis of the eyepiece 33 may become small, and is directed to the eyepiece 33. The pentagonal prism 32 may be formed so that said light beam may be deflected away from the optical axis of the eyepiece 33. If the angles of the entrance and exit surfaces of the deflection prism, i.e., the angles of the surface of the light transmitting portion and the exit surface of the pentagonal prism, are suitably set, the light beam can be deflected away from the optical axis.

Figure 5:
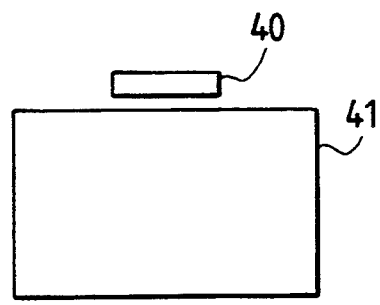
FIG. 5 shows the finder field of view of a finder optical system according to an embodiment of the present invention.

Accordingly, in the finder optical system of the present embodiment, as shown in FIG. 5, the indication 40 of the photographing information in the finder field of view becomes close to an object image 41 and the simultaneous observation of the indicated photographing information and the object becomes easy.

Moreover, as previously described, the light transmitting portion 32b which is the entrance surface for the indicating light to the pentagonal prism and the exit surface 37b of the deflection prism are disposed substantially parallel to each other and the exit surface 32c of the pentagonal prism and the entrance surface 37a of the deflection prism are disposed substantially parallel to each other and therefore, the light transmitting portion 32b to the exit surface 37b of the deflection prism can be regarded as a sheet of plane parallel glass and thus, the creation of astigmatism can be minimized and clear indication of the photographing information can be provided.

Strictly, astigmatism exists also in the eyepiece 33 and there also exists astigmatism resulting from the difference in refractive index between the deflection prism 37 and the pentagonal prism 32 and therefore, in order to correct these, the portion between the light transmitting portion 32b and the exit surface 37b of the deflection prism and the portion between the exit surface 32c of the pentagonal prism and the entrance surface 37a of the deflection lens may be disposed with a slight angle therebetween.

Also, if the deflection prism 37 is made of plastic, the manufacture and working of the deflection prism and the mounting of a support member for supporting the deflection lens at a predetermined location between the pentagonal prism and the eyepiece will become easy and the light weight of the finder can be achieved.

As described above, according to the finder optical system of the present invention, the simultaneous observation of the object and the photographing information is easy and moreover, clear-cut indication of the photographing information is obtained.

What is claimed is:

1. A finder indication optical system in a single-lens reflex camera including:
   an eyepiece;
   an indicator for indicating photographing information;
   a pentagonal prism having a third reflecting surface for reflecting light from an object, a light transmitting portion provided adjacent to said third reflecting surface for receiving a light beam from said indicator and transmitting said light beam therethrough, and a pentagonal prism exit surface from which emerge the light beam from said indicator transmitted through said light transmitting portion and the light from the object reflected by said third reflecting surface; and
   a deflection prism disposed between said eyepiece and said pentagonal prism and having an entrance surface opposed to said pentagonal prism exit surface and substantially parallel to said pentagonal prism exit surface, and a deflection prism exit surface opposed to said eyepiece and substantially parallel to the surface of said light transmitting portion, said deflection prism being for receiving the light beam from said indicator emerging from said pentagonal prism exit surface by said entrance surface and causing said light beam to emerge from said deflection prism exit surface to said eyepiece.

2. A finder indication optical system according to claim 1, wherein said deflection prism is made of plastic.

3. A finder indication optical system according to claim 1, wherein said deflection prism deflects the light beam from said indicator emerging from said pentagonal prism exit surface and makes the angle formed between said light beam and the optical axis of said eyepiece small.

4. A finder indication optical system in a single-lens reflex camera including:
   an eyepiece;
   an indicator for indicating photographing information;
   a pentagonal prism having a third reflecting surface for reflecting light from an object, and a light transmitting portion provided adjacent to said third reflecting surface for receiving a light beam from said indicator and transmitting said light beam therethrough; and
   a deflection prism disposed between said eyepiece and said pentagonal prism for deflecting the light beam from said indicator emerging from said pentagonal prism away from the optical axis of said eyepiece.

5. A finder indication optical system according to claim 4, wherein said deflection prism is made of plastic.

* * * * *